(12) United States Patent
Inuzuka et al.

(10) Patent No.: US 11,201,521 B2
(45) Date of Patent: Dec. 14, 2021

(54) HYBRID TYPE STEPPING MOTOR

(71) Applicant: Minebea Mitsumi Inc., Nagano (JP)

(72) Inventors: Takamasa Inuzuka, Nagano (JP); Mitsushi Goto, Nagano (JP); Masaaki Matsubara, Nagano (JP); Tomohisa Suzuki, Nagano (JP); Atsushi Taroda, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 561 days.

(21) Appl. No.: 15/555,231

(22) PCT Filed: Mar. 3, 2016

(86) PCT No.: PCT/JP2016/056600
§ 371 (c)(1),
(2) Date: Sep. 1, 2017

(87) PCT Pub. No.: WO2016/140310
PCT Pub. Date: Sep. 9, 2016

(65) Prior Publication Data
US 2018/0342926 A1    Nov. 29, 2018

(30) Foreign Application Priority Data
Mar. 5, 2015    (JP) .............................. JP2015-043166

(51) Int. Cl.
*H02K 5/22* (2006.01)
*H02K 37/04* (2006.01)
(Continued)

(52) U.S. Cl.
CPC .............. *H02K 5/225* (2013.01); *H01R 12/52* (2013.01); *H01R 13/405* (2013.01);
(Continued)

(58) Field of Classification Search
CPC .... H01R 12/52; H01R 13/405; H01R 13/631; H02K 37/18; H02K 5/22; H02K 2203/03;
(Continued)

(56) References Cited

U.S. PATENT DOCUMENTS

2015/0108876 A1    4/2015  Kojima et al.
2015/0357886 A1*  12/2015  Ishizeki ................. H02K 11/04
                                                                310/71
(Continued)

FOREIGN PATENT DOCUMENTS

CH              699082 A1       1/2010
JP          05-021958 Y2       6/1993
(Continued)

OTHER PUBLICATIONS

International Search Report and Written Opinion from Corresponding Application No. PCT/JP2016/056600; dated May 31, 2016.

*Primary Examiner* — Thienvu V Tran
*Assistant Examiner* — Lorena D Bruner
(74) *Attorney, Agent, or Firm* — Pearne & Gordon LLP

(57) ABSTRACT

A hybrid stepping motor has a connector housing formed integrally with an insulator having an upper insulator and a lower insulator. The hybrid stepping motor includes a stator core and output terminals concentrically disposed outside the stator core. A wiring pattern serving as the output terminals has connector pins and land portions disposed eccentrically with respect to one another. The land portions are formed on an outer edge side of the wiring pattern. A surface, which is an uppermost surface of the wiring pattern, is located below a lowermost surface, in which jumper wires and lead wires pass, of the lower insulator. The lead wires are pulled out from a lower side, and are pulled out to guiding grooves.

5 Claims, 10 Drawing Sheets

(51) Int. Cl.
*H02K 1/14* (2006.01)
*H02K 7/14* (2006.01)
*H02K 5/10* (2006.01)
*H01R 12/52* (2011.01)
*H01R 13/405* (2006.01)
*H01R 13/631* (2006.01)
*H02K 37/18* (2006.01)
*H02K 11/33* (2016.01)

(52) U.S. Cl.
CPC ........... *H01R 13/631* (2013.01); *H02K 1/146* (2013.01); *H02K 5/10* (2013.01); *H02K 7/14* (2013.01); *H02K 37/04* (2013.01); *H02K 37/18* (2013.01); *H02K 11/33* (2016.01)

(58) Field of Classification Search
CPC ........... H02K 2211/00; H02K 2211/03; H02K 11/30; H02K 11/33; H02K 11/38; H02K 15/0062; H02K 2201/00; H02K 37/04
See application file for complete search history.

(56) References Cited

U.S. PATENT DOCUMENTS

| | | | | |
|---|---|---|---|---|
| 2017/0305457 | A1* | 10/2017 | Koike | H02K 5/22 |
| 2019/0181712 | A1* | 6/2019 | Aso | G01D 5/145 |

FOREIGN PATENT DOCUMENTS

| | | |
|---|---|---|
| JP | 2014-138453 A | 7/2014 |
| JP | 2014-176255 A | 9/2014 |
| WO | 2013/094659 A1 | 6/2013 |

* cited by examiner

HYBRID TYPE STEPPING MOTOR

TECHNICAL FIELD

The present disclosure relates to a hybrid type stepping motor.

BACKGROUND ART

A hybrid type stepping motor is widely used for industrial equipment, for example, office automation (OA) equipment such as printers, copiers, multifunction printers or the like, factory automation (FA) equipment, such as robots, or the like.

In the hybrid type stepping motor, after output electrodes are concentrically arranged on an electrode fixture of an output electrode fixing frame, lead tap wire guide groove sections for a stator winding are formed to extend toward the corresponding output electrodes, and thus lead tap wires for the stator winding can be simply positioned on the output electrodes. As a result, a hybrid type stepping motor having a lead tap wire connecting part of the stator winding which also easily automates work of soldering the lead tap wires for the stator winding to the output electrodes is proposed (for example, see Patent Literature 1).

CITATION LIST

Patent Literature

[Patent Literature 1]: JP-UM-1993(H05)-021958-Y2

SUMMARY OF THE INVENTION

Technical Problem

The hybrid type stepping motor described in Patent Literature 1 is configured such that, after output electrodes 26 are concentrically arranged on an electrode fixture 25 of an output electrode fixing frame 23, lead tap wire guide groove sections 27 for the stator winding are formed to extend toward the corresponding output electrodes 26, and thus the lead tap wires for the stator winding can be simply positioned on the output electrodes 26.

However, as described in FIG. 6A of Patent Literature 1, core wires 31a of leads 31 are fixed on the output electrodes 26 with solder. For this reason, when the lead tap wires for the stator winding are fixed on the output electrodes 26 with solder, bonding of the core wires 31a of the leads 31 is loosened due to heating, thereby causing a conduction failure.

In FIG. 10 of Patent Literature 1, it is described that the output electrodes 26' may have terminal structures and the leads and the output electrodes 26' may be electrically connected using a connector 43 in which a female electrode to which the leads are fixed is provided. However, this structure has a problem in that it cannot cope with the connector of connector pin bonding.

The present disclosure was made in view of the above problem, and one of objects thereof is to provide a hybrid type stepping motor in which a connector housing is formed integrally with an insulator, lead wires for a stator winding can be easily positioned on output terminals, and work of soldering the lead wires for the stator winding to the output electrodes can be automated.

Solution to Problem

To achieve the object, (1) a stepping motor according to a first aspect of the present disclosure is a hybrid type stepping motor in which a connector housing is formed integrally with an insulator having upper and lower insulators, and includes: a stator core; and output terminals concentrically arranged outside the stator core. A wiring pattern serving as the output terminals is configured such that the centers of the connector pins and the land portions are arranged out of alignment, and the land portions are formed on an outer edge side of the wiring pattern, and lead wires are pulled out from a lower side of the lower insulator, and are pulled out to guide grooves.

(2) In the above (1), a surface serving as an uppermost surface of the wiring pattern may be located below a lowermost surface, in which crossover wires and lead wires pass, of the lower insulator.

(3) In the above (1) or (2), the insulator may have locking pins; cross-sectional shapes of the locking pins may be formed in a pentagonal shape of a home base shape; an apex of a protruding corner may be disposed outward; and each corner may become an R-surface.

(4) A stepping motor according to a second aspect of the present disclosure includes: a stator core in which cores of a soft magnetic material are laminated; a rotor arranged inside the stator core and configured to rotate about a rotational axis; front and rear flanges arranged at both ends of a stator in a direction in which the rotational axis of the rotor extends and configured to rotatably support the rotational axis of the rotor; an upper insulator arranged between the stator core and the front flange and formed of an insulating material; and a lower insulator arranged between the stator core and the rear flange and formed of an insulating material. A connector housing protruding outward from the stator core is formed integrally with at least one of the upper insulator and the lower insulator, and guide grooves guiding lead wires of a winding wound around the stator core are formed. An inner connector in which a plurality of connector pins are insert-molded and a wiring board in which a wiring pattern having a plurality of output terminals electrically connected to the plurality of connector pins are mounted on the connector housing. The plurality of output terminals are disposed on an outer edge side of the wiring pattern side by side in an arranging direction perpendicular to a direction in which the plurality of connector pins extend. At least one of the plurality of output terminals is arranged at a position misaligned in the arranging direction from a position at which the corresponding connector pin among the plurality of connector pins is connected with the wiring pattern, and the lead wires guided by the guide grooves are connected to the wiring pattern from a side opposite to a side at which the inner connector is mounted on the connector housing.

(5) In the above (4), the plurality of connector pins may be electrically connected to the wiring pattern in a state in which the connector pins are inserted into insertion holes formed in the housing and through-holes formed in the wiring board.

Advantageous Effects of the Invention

According to the present disclosure, a hybrid type stepping motor in which a connector housing is formed integrally with an insulator, lead wires for a stator winding can be easily positioned on output terminals, and work of soldering the lead wires for the stator winding to the output electrodes can be automated can be provided.

DESCRIPTION OF EMBODIMENTS

Hereinafter, a mode for carrying out the present disclosure (hereinafter referred to as "embodiment") will be described in detail based on the attached drawings.

Figure 1:
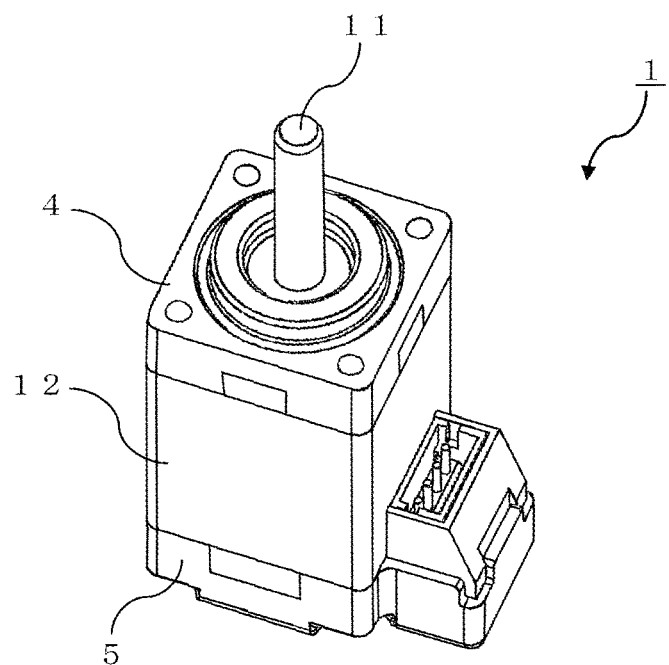
FIG. 1 is a perspective view of a hybrid type stepping motor according to the present disclosure.
Figure 2:
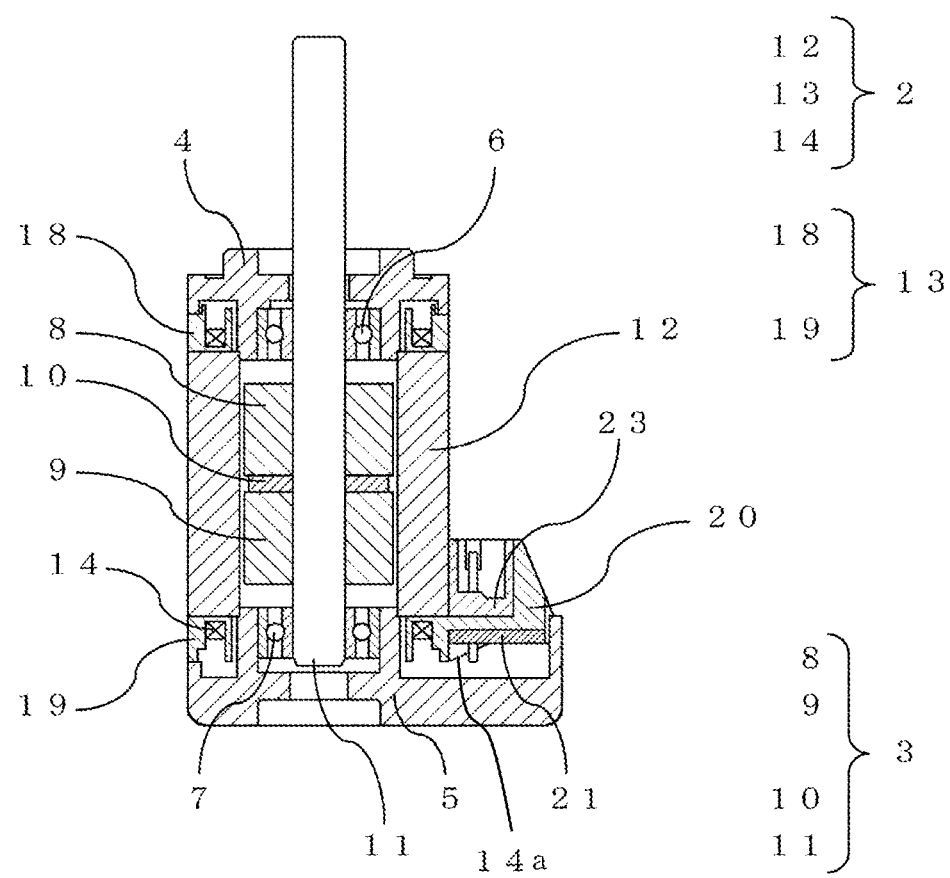
FIG. 2 is a sectional view of the hybrid type stepping motor illustrated in FIG. 1.
Figure 3:
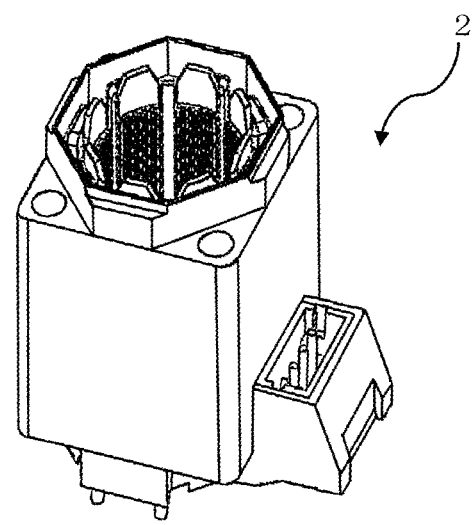
FIG. 3 is a perspective view of a stator of the hybrid type stepping motor illustrated in FIG. 1.

FIG. 1 is a perspective view of a hybrid type stepping motor according to the embodiment. FIG. 2 is a sectional view of the hybrid type stepping motor illustrated in FIG. 1. FIG. 3 is a perspective view of a stator of the hybrid type stepping motor illustrated in FIG. 1.

The hybrid type stepping motor of the present invention is a two-phase hybrid type stepping motor in which output terminals are concentrically arranged outside a stator core in a structure in which a connector housing is formed integrally with an insulator.

The hybrid type stepping motor 1 includes a stator 2, a rotor 3 rotatably disposed inside the stator 2, and front and rear flanges 4 and 5 set up on opposite ends of the stator 2 in an axial direction. Bearings 6 and 7 are mounted on the front flange 4 and the rear flange 5, respectively, and rotatably support the rotor 3. The rotor 3 includes two rotor cores 8 and 9 configured to laminate a predetermined number of sheets of cores made of a soft magnetic material (for example, a silicon steel sheet or the like), a disc-shaped rotor magnet 10 arranged between the two rotor cores 8 and 9, and a shaft 11 formed of a non-magnetic material, and a plurality of small teeth are formed on an outer circumferential surfaces of the two rotor cores 8 and 9 at equal pitches. The rotor magnet 10 is bipolarized in an axial direction.

The stator 2 includes a stator core 12 configured by laminating a predetermined number of sheets of cores made of a soft magnetic material (for example, a silicon steel sheet or the like), an insulator 13 formed of an insulating material mounted on the stator core 12, and a stator winding 14 wound around the stator core 12 via the insulator 13. The stator core 12 is configured such that eight magnetic poles 15 protruding inward from an annular yoke part in a radial direction are arranged at equal pitches of 45 degrees, and includes pole teeth 16 at tip portions thereof, the pole teeth being expanded in a circumferential direction, and a plurality of small teeth 17 are formed on surfaces of the pole teeth 16 opposite to the rotor cores 8 and 9 at equal pitches.

The front flange 4 and the rear flange 5 serves as an external case of the hybrid type stepping motor 1. The front flange 4 and the rear flange 5 allow the rotor 3 to be rotated by bearings of central portions thereof. The front flange 4 and the rear flange 5 are fixed by bolts, and sandwich and fix the stator 2.

The insulator 13 includes an upper insulator 18 and a lower insulator 19 that are mounted from both sides of the stator core 12 in an axial direction. The connector housing 20 protruding outward in a radial direction is formed integrally with the lower insulator 19.

The lower insulator 19 fitted on a lower side of the stator core 12 has target wiring parts 19a around which a predetermined number of windings are wound, an approximately polygonal outer ring part 19b connecting the target wiring parts 19a, and locking pins 31 that are erected at the outer ring part 19b to lock crossover wires. Flanges 19c are erected close to tips of the target wiring parts 19a in order to prevent collapse of the windings. A predetermined number of windings are wound around the target wiring parts 19a between the flanges 19c and an inner circumferential surface of the outer ring part 19b.

First, a PCB board 21 in which wiring patterns 22 are formed is mounted at one side of the connector housing 20 of the lower insulator 19, and an inner connector 23 in which connector pins 24 are insert-molded is mounted inside the other side of the connector housing 20. The connector pins 24 are inserted into through-holes 25 of the connector housing 20 and through-holes 26 of the PCB board 21, and are electrically connected to the wiring patterns 22 with solder. The inner connector 23 is to use a four-pin connector sold on the market, but it may be naturally configured to insert-mold the connector pins at a location of the connector housing 20.

After the insulator 13 is mounted on the stator core 12 formed by laminating a predetermined number of sheets of cores, the stator winding 14 is wound at locations serving as the target wiring parts from the top of the insulator 13 by a predetermined number of turns.

The wiring patterns 22 serving as the output terminals are formed with land portions 27 for bonding lead wires 14a which are terminal ends of the stator winding 14, at one end side (an outer side) thereof with solder, and the through-holes 26 for inserting the connector pins 24 at the other side (a stator side) thereof. As in the figure, the wiring patterns 22 are each configured such that the center C1 of each land portion 27 and the center C2 of each through-hole (terminal pin) 26 are out of alignment without being consistent with each other. The wiring pattern 22 is disposed in line symmetry in which the center C0 of the PCB board 21 is set as a symmetric axis. As in the figure, four patterns are formed on the PCB board 21, and the stator winding 14 is bipolar-driven. In the present embodiment, the four patterns are configured to be formed using the four-pin connector, but they are not limited to this configuration, and are formed according to the number of required pins.

As illustrated, the stator winding 14 is configured to wind a first phase, and then wind a second phase. In each phase, each winding part is wound from a lower side toward an upper side, and the lead wires 14a are finally pulled out from the lower side in such a manner that they are directly positioned on the land portions 27 through guide grooves 30. The lead wires 14a are electrically connected to the land portions 27 by an automatic soldering machine (not shown). After the connection, unnecessary portions of the lead wires 14a are cut. Since the guide grooves 30 have V-shaped cross sections in which groove widths thereof are gradually reduced, the lead wires 14a of the stator winding 14 are smoothly guided into the guide grooves 30.

Figure 4:
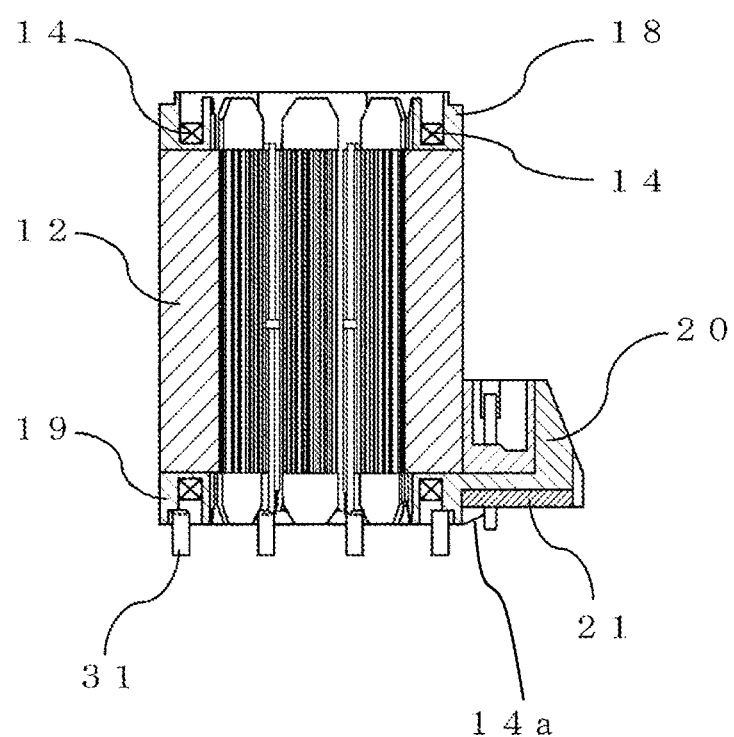
FIG. 4 is a sectional view of the stator illustrated in FIG. 3.
Figure 5:
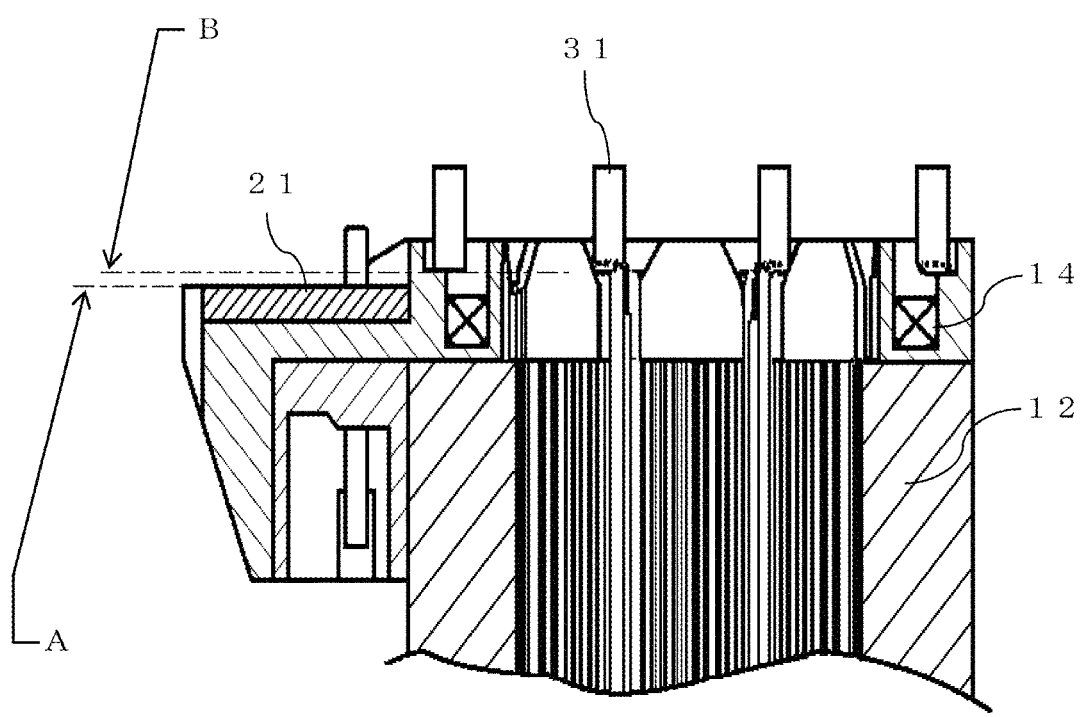
FIG. 5 is a partial enlarged view of the stator illustrated in FIG. 4.
Figure 6:
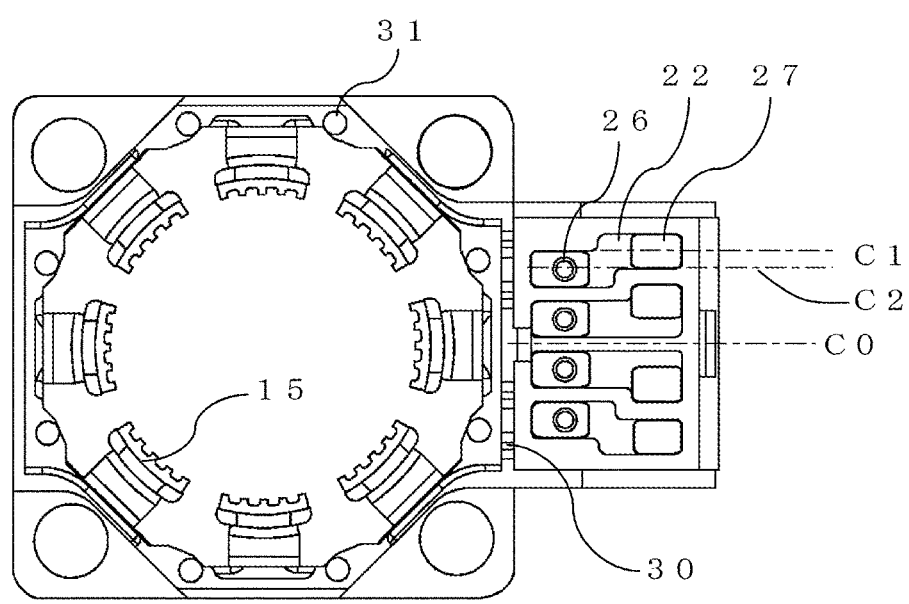
FIG. 6 is a bottom view of the stator illustrated in FIG. 3.
Figure 7:
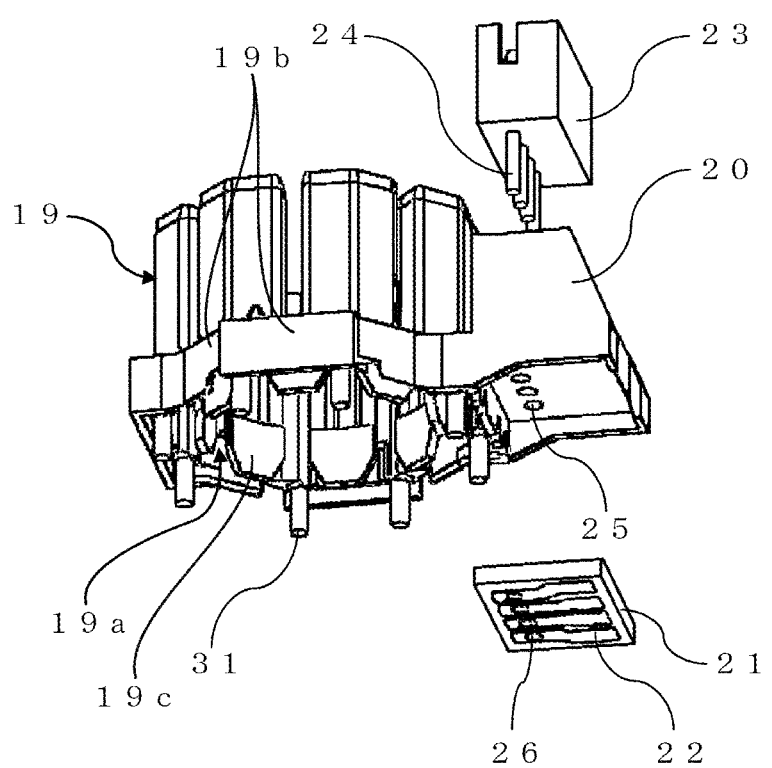
FIG. 7 is an exploded perspective view of a lower insulator portion illustrated in FIG. 3.

FIG. 4 is a sectional view of the stator, and FIG. 5 is a partial enlarged view of FIG. 4. FIG. 6 is a bottom view of the stator illustrated in FIG. 3. FIG. 7 is an exploded perspective view of a lower insulator portion illustrated in FIG. 3.

For convenience, to describe the state in which the lead wires 14a of the stator winding 14 are pulled out to the PCB board 21, the lower insulator 19 is in a state in which it is disposed at the upper side of the figure. As in the figure, a lowermost surface, in which the crossover wires (and the lead wires 14a) pass, of the lower insulator 19 and a surface (an uppermost surface) of the wiring pattern 22 formed in the PCB board 21 do not have a positional relation of the same surface. When the stator is set for a winding machine with the lower insulator 19 set laterally, the surface (the uppermost surface) of the wiring pattern 22 is located below the lowermost surface, in which the crossover wires (and the lead wires 14a) pass, of the lower insulator 19. For this reason, when the lead wires 14a of the stator winding 14 are pulled out to the PCB board 21, movement of a nozzle of the winding machine is not restricted, and workability is facilitated.

Figure 10:
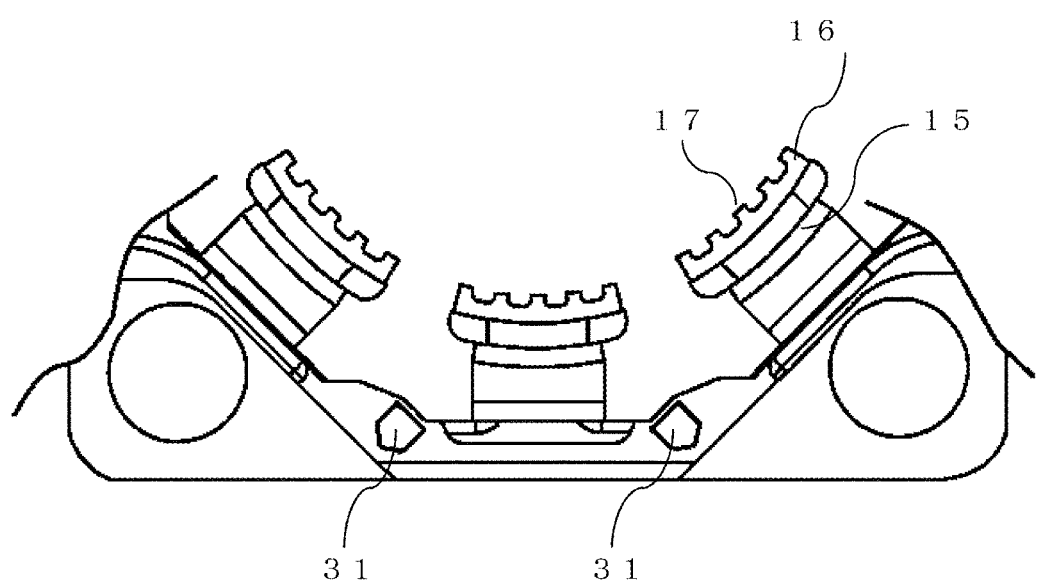
FIG. 10 is a view illustrating another example of a locking pin of an insulator in the hybrid type stepping motor of the present disclosure.

The locking pins 31 for locking the crossover wires of the stator winding 14 have round pin shapes. However, each of the locking pins 31 may be configured such that, as in FIG. 10, a cross-sectional shape thereof is formed in a pentagonal shape of a home base shape, an apex of a protruding corner thereof is disposed outward, and each corner becomes an R-surface. The locking pins are formed in this shape, and thereby strength can be improved compared to the round pin shape. As a result, deformation of the locking pins can be prevented by a tension when the crossover wires of the winding are hung on the locking pins 31.

The connector pins 24 are straight rods, but when an inserting direction of the external connector is set to a radial direction, a L-shaped pin may be formed by insert molding.

Figure 8:
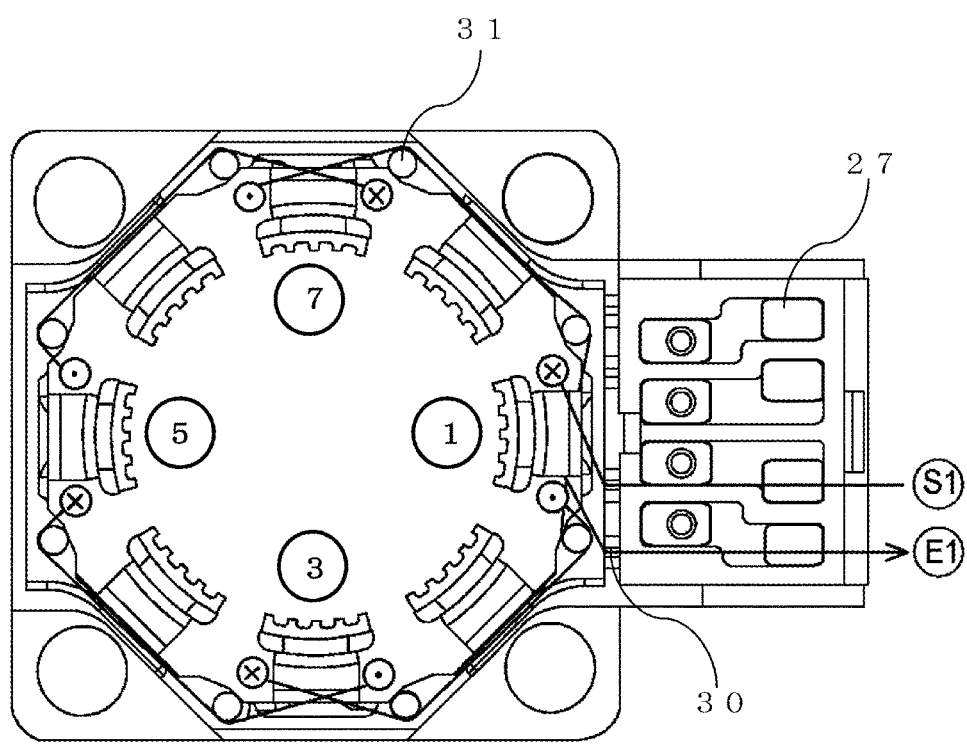
FIG. 8 is an explanatory view of a first phase winding pattern of the hybrid type stepping motor according to the present disclosure.

The first phase winding pattern is illustrated in FIG. 8. As illustrated in FIG. 8, the stator core 12 is configured such that the eight magnetic poles 15 are equally arranged at a pitch of 45 degrees in a circumferential direction, and the stator winding 14 is wound around first, third, fifth, and seventh magnetic poles 15 in a clockwise direction by a predetermined number of turns. In the figure, S1 indicates a start of first phase winding, and E1 indicates an end of the first phase winding. In addition, a cross mark indicates a state in which the winding is directed from a front side toward a rear side, and a point mark a state in which the winding is directed from the rear side toward the front side. First, a magnet wire is wound around the first magnetic pole 15 from the front side toward the rear side from above the land portion 27 through the guide groove 30, and is then pulled out from the rear side toward the front side. The crossover wire is routed along the locking pins 31, and the magnet wire is wound around the third magnetic pole 15 from the front side toward the rear side. Next, the magnet wire is sequentially wound around the fifth and seventh magnetic poles 15 in a clockwise direction, and is finally pulled out from the rear side toward the front side through a lower side of the first magnetic pole 15. Then, the magnet wire is guided to the guide groove 30, and is positioned on the land portion 27 through the guide groove 30.

Figure 9:
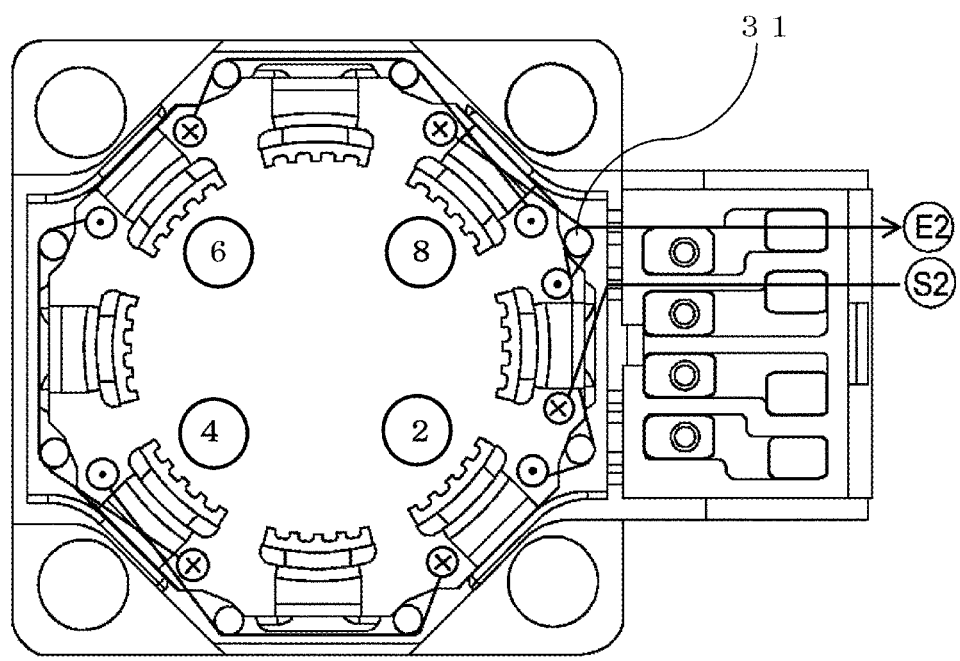
FIG. 9 is an explanatory view of a second phase winding pattern of the hybrid type stepping motor of the present disclosure.

The second phase winding pattern is illustrated in FIG. 9. As illustrated in FIG. 9, the stator winding 14 is wound around eighth, sixth, fourth, and second magnetic poles 15 in a counterclockwise direction by a predetermined number of turns. In the figure, S2 indicates a start of second phase winding, and E2 indicates an end of the second phase winding. First, a magnet wire is directed from the front side toward the rear side of the first magnetic pole 15 from above the land portion 27 through the guide groove 30, and is pulled out from the rear side toward the front side through the lower side of the first magnetic pole 15. Then, the crossover wire is routed along the locking pins 31, and the magnet wire is wound around the eighth magnetic pole 15 from the front side toward the rear side. Next, the magnet wire is sequentially wound around the sixth, fourth and second magnetic poles 15. Finally, the crossover wire is hung on the locking pin 31 from a lower side of the second magnetic pole 15, passes through the lower side of the first magnetic pole 15, is hung on the locking pin 31 from the lower side of the second magnetic pole 15, is guided to the guide groove 30, and is pulled out on the land portion 27, and is positioned (E2).

In this way, the lead wires of the winding at the side of the end of the winding along with the first and second phases are configured to be guided to the guide grooves 30 from the lower side, and thus can be smoothly guided to the guide grooves 30.

According to the embodiment of the present invention, the lead wires are pulled out from the lower side and to the guide grooves 30, and can be guided to the guide grooves 30. As a result, there is no chance of disconnection of the lead wires. The wiring pattern 22 serving as the output terminals is configured such that the centers of the connector pin 24 and the land portion 27 are out of alignment. Thus, even when the lead wires of the stator winding 14 are positioned and bonded on the land portions 27, the work can be done without being affected by the positions of the connector pins 24.

Since the connector pins 24 and the land portions 27 are separated and formed at the both ends of the wiring pattern 22 serving as the output terminals, melting of the solder of the connector pins 24 can be prevented when the lead wires are connected to the land portions 27. Unlike in Patent Literature 1, since the external connection is not formed by the leads, there is no chance of the bonding being loosened to lead to a conduction failure. Since the land portions 27 are formed on an outer edge side of the wiring pattern 22, a degree of opening when the work is done by the automatic solder machine is high.

Since the surface (the uppermost surface) A of the wiring pattern 22 is located below the lowermost surface B, in which the crossover wires (and the lead wires) pass, of the lower insulator 19. When the lead wires of the stator winding 14 are pulled out to the PCB board 21, the movement of the nozzle of the winding machine is not restricted, and the workability is facilitated.

An embodiment according to the present disclosure has been described. However, the present disclosure is not limited to the embodiment, and can be modified in various ways without departing the gist thereof.

This application is based upon and claims the benefit of priority from Japanese Patent Application No. 2015-043166, filed on Mar. 5, 2015, the entire contents of which are incorporated herein by reference.

INDUSTRIAL APPLICABILITY

The hybrid type stepping motor of the present invention is a hybrid type stepping motor in which a connector housing is formed integrally with an insulator, and is useful in that positioning of lead wires of a stator winding on output terminals can be facilitated, and work of soldering the lead wires of the stator winding to the output electrodes can be automated.

LIST OF REFERENCE NUMERALS

12: Stator core
13: Insulator
18: Upper insulator
19: Lower insulator
22: Wiring pattern
24: Connector pin
27: Land portion
30: Guide groove
A: Surface serving as uppermost surface of wiring pattern
B: Lowermost surface in which crossover wires and lead wires pass

What is claimed is:

1. A hybrid type stepping motor in which a connector housing is formed integrally with an insulator having an upper insulator and a lower insulator, the hybrid type stepping motor comprising:
a stator core:
a stator winding wound around the stator core through the upper insulator and the lower insulator, the stator winding having lead wires; and
output terminals arranged at one location radially outside the stator core and configured to be electrically connected to connector pins, the output terminals having land portions for connecting the lead wires,
wherein a wiring pattern serving as the output terminals is configured such that centers of the connector pins and the land portions are arranged to be out of alignment at the one location radially outside the stator core, and the land portions are located at an outer edge side of the wiring pattern,
wherein the lead wires are pulled out from a lower side of the lower insulator through guide grooves which are provided to the lower insulator, and
wherein the wiring pattern is formed in a wiring board, and the wiring board is mounted only at one side of the one location radially outside the stator core.

2. The hybrid type stepping motor according to claim 1, wherein a surface serving as an uppermost surface of the wiring pattern is located below a lowermost surface of the lower insulator, on which crossover wires and the lead wires pass.

3. The hybrid type stepping motor according to claim 1, wherein at least one of the upper insulator and the lower insulator is provided with locking pins having cross-sectional shapes in a pentagonal shape of a home base shape having five corners including one protruding corner,
wherein an apex of the protruding corner is disposed to face outward, and
wherein each of the five corners is formed to have a round surface.

4. A stepping motor comprising:
a stator core having laminated cores of a soft magnetic material;
a rotor arranged inside the stator core and configured to be rotatable about a rotational axis;
front and rear flanges arranged at both ends of a stator in a direction in which the rotational axis of the rotor extends and configured to rotatably support the rotational axis of the rotor;
an upper insulator arranged between the stator core and the front flange and made of an insulating material;
a lower insulator arranged between the stator core and the rear flange and made of an insulating material; and
a stator winding wound around the stator core through the upper insulator and the lower insulator, the stator winding having lead wires,
wherein at least one of the upper insulator and the lower insulator is provided with a connector housing and guide grooves at one location radially outside the stator core, the connector housing being integrally provided with the at least one of the upper insulator and the lower insulator and protruding outward from the stator core, the guide grooves being configured to guide the lead wires,
wherein the connector housing is attached with an inner connector, in which a plurality of connector pins are insert-molded, and a wiring board, in which a wiring pattern having a plurality of land portions for connecting the lead wires and electrically connected to the plurality of connector pins is formed,
wherein the plurality of land portions are arranged on an outer edge side of the wiring pattern in an arranging direction that is perpendicular to a direction in which the plurality of connector pins extend,
wherein, at the one location radially outside the stator core, a position of at least one of the plurality of land portions and a position at which the corresponding connector pin among the plurality of connector pins is connected with the wiring pattern are arranged so as to be shifted in the arranging direction relative to each other,
wherein the lead wires guided by the guide grooves are connected to the wiring pattern from a side opposite to a side at which the inner connector is mounted on the connector housing, and
wherein the wiring pattern is formed in a wiring board, and the wiring board is mounted only at one side of the one location radially outside the stator core.

5. The stepping motor according to claim 4, wherein the plurality of connector pins are electrically connected to the wiring pattern in a state in which the connector pins are inserted into insertion holes formed in the housing and through-holes formed in the wiring board.

* * * * *